United States Patent
Liao et al.

(10) Patent No.: US 11,254,780 B2
(45) Date of Patent: Feb. 22, 2022

(54) METHOD FOR PREPARING AQUEOUS POLYURETHANE DISPERSION

(71) Applicant: NAN YA PLASTICS CORPORATION, Taipei (TW)

(72) Inventors: Te-Chao Liao, Taipei (TW); Sen-Huang Hsu, Taipei (TW); Chia-Lung Tsai, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 285 days.

(21) Appl. No.: 16/575,503

(22) Filed: Sep. 19, 2019

(65) Prior Publication Data
US 2020/0325266 A1    Oct. 15, 2020

(30) Foreign Application Priority Data
Apr. 12, 2019 (TW) ................ 108112842

(51) Int. Cl.
*C08G 18/08* (2006.01)
*C08G 18/38* (2006.01)

(52) U.S. Cl.
CPC ..... *C08G 18/0828* (2013.01); *C08G 18/3855* (2013.01)

(58) Field of Classification Search
CPC ................................. C08G 18/0828
See application file for complete search history.

(56) References Cited

FOREIGN PATENT DOCUMENTS

| CN | 106496488 A | 3/2017 | |
|----|-------------|--------|--|
| EP | 0377297 A2 * | 7/1990 | ......... C08G 18/0828 |
| TW | 201714905 A | 5/2017 | |

* cited by examiner

*Primary Examiner* — Christopher M Rodd
(74) *Attorney, Agent, or Firm* — Li & Cai Intellectual Property (USA) Office

(57) ABSTRACT

A method for preparing an aqueous polyurethane dispersion includes the following steps. The method characterized in that it introduces an ethoxy group to sodium ethylenediamine sulfonate ($H_2N-CH_2CH_2NHCH_2CH_2SO_3Na$) serving as an anionic chain extender to form sodium ethylenediamino ethoxyethyl sulfonate ($H_2NCH_2CH_2NHCH_2CH_2OCH_2CH_2SO_3Na$). Next, hydrophilic groups of sodium ethylenediamino ethoxyethyl sulfonate are used to prepare an aqueous polyurethane to improve the flowability of the resin, in which the polyurethane prepolymer has an isocyanate group at its end. More than one acrylate monomer is used for dilution and reduction of viscosity, and hydrophilic and amine groups containing sulfonate is used for water dispersion and to carry out a chain extension reaction. After that, an initiator is added for acrylic polymerization, so as to modify polyurethane with graft acrylic.

10 Claims, 1 Drawing Sheet

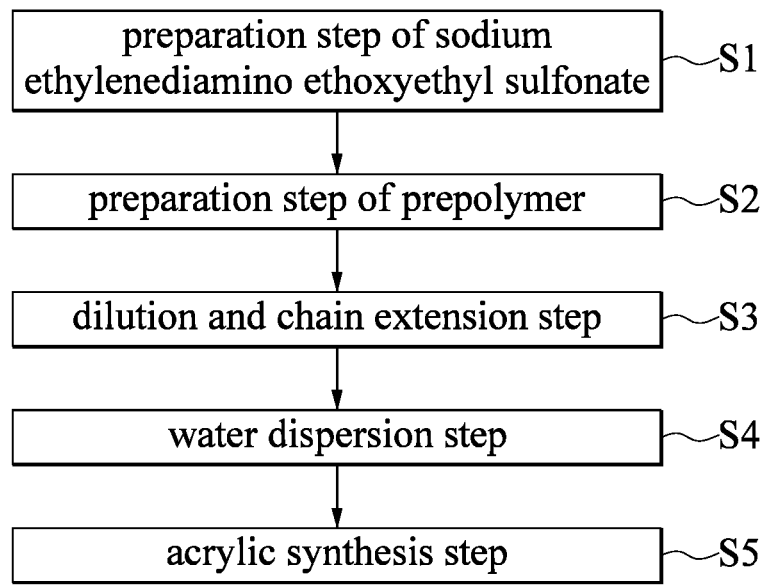

METHOD FOR PREPARING AQUEOUS POLYURETHANE DISPERSION

CROSS-REFERENCE TO RELATED PATENT APPLICATION

This application claims the benefit of priority to Taiwan Patent Application No. 108112842, filed on Apr. 12, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an improved method for manufacturing an aqueous polyurethane, and more particularly to a method for manufacturing an aqueous polyurethane dispersion.

BACKGROUND OF THE DISCLOSURE

In recent years, with the increase of safety and environmental awareness, there has been a global trend in restricting emission of volatile organic compounds (VOCs) and related solvents. Particularly, applications related to the aqueous polyurethane have been widely studied with the aim of further reducing the use of solvent.

One available hydrophilic agent of the aqueous polyurethane is a carboxylate such as dimethylol propionic acid (DMPA) or dimethylolbutanoic acid (DMBA), which needs to work with triethylamine (TEA) as a neutralizer. However, TEA is a toxic compound and has an irritating odor, and thus the resulting products cannot meet low odor requirements. Another available hydrophilic agent is a sulfonate such as sodium 2-[(2-aminoethyl) amino]ethanesulphonate (AAS) or sodium 3,5-diaminobenzenesulfonate (DABS), which has a stronger hydrophilicity than the carboxylate and has a relatively high ionization strength, and therefore the amount of the hydrophilic agent can be reduced. In addition, the sulfonate is electrically neutral and can be used to prepare a highly stable aqueous polyurethane without adding amines for neutralization.

The acrylic-grafted modifying method that is used in place of acetone dilution can improve the shortcomings of polyurethane including low mechanical strength and low heat and water resistances. However, the acrylic-modified polyurethane has a hard structure, and when applied to the treatment agent of the PU synthetic leather, a target material may not be filled into the groove bottoms of the synthetic leather.

SUMMARY OF THE DISCLOSURE

The problem to be solved of the present disclosure is that, a large amount of a solvent, which may harm human health and cause environmental pollution, and an acetone distillation and recovery equipment are required for the conventional acetone method of producing aqueous polyurethane, and a lot of residual acetone still remain after solvent distillation, which cannot meet aqueous requirements. However, the viscosity of the prepolymer would be limited by the dispersion of the prepolymer, and thus only the less reactive isocyanate can be used in the prepolymer mixing method, so that the resulted aqueous PU usually has a poor quality.

In addition, the acrylic-grafted modifying method that is used in place of acetone dilution can meet the solvent-free requirements, and can improve the shortcomings of polyurethane including low mechanical strength and low heat and water resistances. However, the acrylic-modified polyurethane has a hard structure and the resulted treatment agent of the PU synthetic leather has poor flowability.

In order to solve the above problem, a technical solution proposed by the present disclosure includes the following steps. Firstly, an ethoxyl group is introduced into sodium ethylenediamino ethyl sulfonate ($H_2NCH_2CH_2NHCH_2CH_2SO_3Na$) serving as an anionic chain extender to form ethylenediamino ethoxyethyl sulfonate ($H_2NCH_2CH_2NHCH_2CH_2OCH_2CH_2SO_3Na$). Next, hydrophilic groups of ethylenediamino ethoxyethyl sulfonate are used to prepare an aqueous polyurethane resin so as to increase the flowability of the resin, and acrylate monomers are used in place of acetone to dilute a polyurethane prepolymer. The monomers can be added without cooling. The prepolymer can be well dispersed, which is favorable for subsequent water dispersion, such that no aggregation occurs and there is no residual acetone. More acrylate monomers used together can achieve good physical properties and a synergistic action among dissolution and dispersion. Three monomers, namely 2-hydroxyethyl acrylate (2-HEA), methyl methacrylate (MMA) and ethyl acrylate (EA), which are used together and added after the prepolymer has been reacted for 2-3 hours, can exert the effect of solvent dispersion and can perform a graft polymerization in the final stage of acrylic synthesis. In the three monomers, 2-hydroxyethyl acrylate (2-HEA) containing hydroxyl groups (—OH) can react with isocyanate, and methyl methacrylate (MMA) and ethyl acrylate (EA) can increase the molecular weight of acrylic and remedy the shortcomings of polyurethane including poor heat resistance and low mechanical strength, so as to possess both excellent physical properties and solvent effect. In addition, no acetone is used so that the synthesis reaction yield can be significantly increased and the production cost can be effectively reduced.

The present disclosure introduces an ethoxyl group to form an aqueous polyurethane dispersion based on ethylenediamino ethoxyethyl sulfonate while using an acrylic-grafting modification. The main chain of the polyurethane resin has anionic and nonionic groups which are formed from polyisocyanates and polyols. The side chains of the polyurethane resin have anionic and nonionic groups which contain sodium sulfonate molecules, wherein the sodium sulfonate molecules each have an ethoxyl group and have acrylic groups dispersed therein. The present disclosure provides a method for preparing an aqueous polyurethane dispersion, which includes the following steps: (1) a preparation step of sodium ethylenediamino ethoxyethyl sulfonate; (2) a preparation step of a prepolymer; (3) a dilution and chain extension step of the prepolymer; (4) a water dispersion step; and (5) an acrylic synthesis step. In the step (1), 40-60 wt % of sodium ethylenediamino sulfonate, 280-300 wt % of ethylene glycol and 1.2-2.0 wt % of sodium hydroxide are reacted at 180-200° C. for 8-10 hours. After lowering the reaction temperature to below 50° C., a hydrochloric acid solution is added to adjust the pH value to 7-8, and a reduced pressure distillation is performed to remove excess ethylene glycol, so as to obtain sodium ethylenediamino ethoxyethyl sulfonate.

In the step (1), 40-60 wt % of sodium 2-hydroxyethyl sulfonate, 280-300 wt % of ethylene glycol and 1.2-2.0 wt % of sodium hydroxide are reacted at 180-200° C. for 8-10 hours. After lowering the reaction temperature to below 50° C., a hydrochloric acid solution is added to adjust the pH value to 7-8, and a reduced pressure distillation is performed to remove excess ethylene glycol, so as to obtain sodium ethylenediamino ethoxyethyl sulfonate.

In the step (2), based on the total weight of the reaction raw material including deionized water, 15-25 wt % of a polyol is added into a reactor equipped with a mixer, a thermometer and a condensing tube after vacuum-dehydration. When an oil bath temperature reaches 70-80° C., a metered amount of 5-12 wt % of a polyisocyanate is added into the reactor to carry out a synthetic reaction.

In the step (3), after reacting the prepolymer for 2-3 hours, an acrylic monomer is added to reduce the viscosity of the prepolymer, and the reaction temperature is maintained at 85-90° C. until an NCO content reaches a target value of NCO % (determined by the di-n-butylamine method). After that, 1.8-3.7 wt % of sodium ethylenediamino ethoxyethyl sulfonate obtained from the step (1) is added to continue the reaction for 25-40 minutes.

In the step (4), a polymer obtained from the step (3) is cooled to room temperature, and 35-55 wt % of deionized water is added under a high speed shearing force that is generated at 500 rpm. Subsequently, a metered amount of 0.1-0.5 wt % of a chain extender is added to carry out a chain extension reaction for 30 minutes, so as to obtain a solvent-free sulfonate-type aqueous polyurethane dispersion.

In the step (5), the aqueous polyurethane dispersion obtained from the step (4) is mixed with 0.3-1.0 wt % of an emulsifier to form an emulsion. After stirring evenly, the reaction temperature is raised to 75-85° C. and then 0.01-0.10 wt % of an initiator is dropwise added to carry out an acrylic polymerization reaction for 1-3 hours. After the reaction temperature is cooled to 50-70° C., 0.01-0.08 wt % of a reducing agent is added, thereby obtaining an acrylic-grafting-modified aqueous polyurethane.

The term "target value of NCO %" refers to, after isocyanato groups (—NCO) of polyisocyanate are completely reacted with hydroxyl groups (—OH) of the polyol in a polyurethane (PU) reaction, the weight percentage of the remaining isocyanato groups (—NCO) relative to the weight of the total reactants. The target value of NCO % satisfies the following formula: (the amount of the polyisocyanate/the molecular weight of the polyisocyanate— the amount of the polyol/the molecular weight of the polyol)×42×2×%. In the present embodiment, the NCO content (NCO %) is determined by the di-n-butylamine method before the reaction, i.e., before the preparation step of adding water and emulsification.

If the NCO content of the polyurethane resin is between 50% and 85% of the theoretical NCO content, the polyurethane resin would be stably dispersed in the aqueous polyurethane dispersion so that the formation gels due to the aggregation of the polyurethane resin can be avoided. If the polyisocyanate is excessively consumed in the synthesis of the polyurethane resin and the NCO content of the polyurethane resin is thus less than 50% of the target value of NCO %, the polyurethane net structure would have a high degree of crosslinking due to the excessive reaction of polyurethane and this would cause failure in the form of a large amount of polyurethane in the aqueous phase being aggregated into gels. If the NCO content of the polyurethane resin is greater than 85% of the target value of NCO %, the synthesized polyurethane would have a lack of net structure, and thus, after the aqueous polyurethane is processed into a film, the film would have highly viscous surfaces that may cause adhesion between films and result in scrappage.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 1 is a flow chart of a method for preparing an aqueous polyurethane dispersion of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, the present disclosure provides a method for preparing an aqueous polyurethane dispersion. The method is a five-stage polymerization method, which is favorable to synthesize a kind of solvent-free hydrophilic group-containing aqueous polyurethane whose chemical structure is grafted with acrylic monomers. The method for preparing a hydrophilic group-containing acrylic-grafting-modified aqueous polyurethane is taken as an implementation example for illustration, which includes the following steps.

Step S1 is a preparation step of sodium ethylenediamino ethoxyethyl sulfonate.

In the step S1, sodium ethylenediamino sulfonate is reacted with ethylene glycol to obtain sodium ethylenediamino ethoxyethyl sulfonate.

Step S2 is a preparation step of a prepolymer.

In the step S2, the polyol can be a polyester polyol, a polyether polyol, a polycarbonate polyol or any combination thereof.

The polyester polyol is obtained by a condensation reaction between a low molecular weight polyol and a dicarboxylic acid. For example, a low molecular weight polyol selected from the group consisting of ethylene glycol, 1,3-propanediol and 1,4-butylene glycol and an aliphatic dicarboxylic acid selected from the group consisting of succinic acid, glutaric acid, adipic acid, heptanedioic acid, suberic acid, azelaic acid, sebacic acid, decane dicarboxylic acid and cyclohexane dicarboxylic acid are used to form a condensed polyester polyol.

In addition, the polyol can also be an amide-based polyester amide polyol such as hexamethylene diamine and isophorone diamine, which is obtained from a cyclic ester (e.g., c-caprolactone) and a part of the diol component.

The aforesaid polyols may be used alone or in any combinations thereof, and their copolymers can also be used.

The polyether polyol is selected from the group consisting of poly(tetramethylene ether) glycol (PTMG), polypropanediol (PPG) and polyether polyols whose main chain and side chain(s) are poly ethylene glycol (PEG) chains.

The film formed by a diisocyanate, preferably an aliphatic or alicyclic diisocyanate, has better physical strength and weather resistance.

The aliphatic diisocyanate may be selected from the group consisting of tetramethylene diisocyanate, hexamethylene diisocyanate, decamethylene diisocyanate and lysine diisocyanate, and preferably be hexamethylene diisocyanate.

The alicyclic diisocyanate may be selected from the group consisting of isophorone diisocyanate, hydrogenated tolylene diisocyanate, hydrogenated xylene diisocyanate, hydrogenated diphenylmethane diisocyanate and tetramethylxylene diisocyanate, and preferably be isophorone diisocyanate.

Urethane-modified compounds, carbodiimide-modified compounds, allophanate-modified compounds, urea-modified compounds, biuret-modified compounds, uretodion-modified compounds, uretonimine-modified compounds and isocyanurate-modified compounds of the aforesaid aliphatic diisocyanate or alicyclic diisocyanates can further be used in the step (2).

The aforesaid aliphatic diisocyanate or alicyclic diisocyanates may be used alone or in any combinations of two thereof.

The aromatic isocyanate may be selected from at least of 2,4-toluene diisocyanate, 2,6-toluene diisocyanate, xylene-1,4-diisocyanate, xylene-1,3-diisocyanate, 4,4'-diphenylmethane diisocyanate, 2,4'-diphenylmethane diisocyanate, 4,4'-diphenyl ether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropanediisocyanate, m-phenyl diisocyanate, p-phenyl diisocyanate, naphthalene-1,4-diisocyanate, naphthalene-1,5-diisocyanate, 3,3'-dimethoxydiphenyl-4,4'-diisocyanate, polyphenylene polymethylene polyisocyanate and crude tolylene diisocyanate.

Low molecular weight polyol(s) may be suitable for the urethane reaction in which the main raw material includes polyol(s) and diisocyanate(s).

The examples of the low molecular weight polyol include ethylene glycol, 1,3-propanediol, 1,2-propanediol, 1,2-butylene glycol, 1,3-butylene glycol, 1,4-butylene glycol, 1,5-pentadiol, 1,6-hexanediol, 3-methyl-1,5-pentadiol, neopentadiol, 1,8-ethohexadiol, 1,9-nonanediol, 3,3-dihydroxymethylheptane, diglycol, 1,4-cyclohexanediol, 1,4-cyclohexanedimethanol, 2-ethyl-1,3-propanediol, 2-n-propyl-1,3-propanediol, 2-isopropyl-1,3-propanediol, 2-n-butyl-1,3-propanediol, 2-isobutyl-1,3-propanediol, 2-tert-butyl-1,3-propanediol, 2-methyl-2-ethyl-1,3-propanediol, 2,2-diethyl-1,3-propanediol, 2-ethyl-2-n-propyl-1,3-propanediol, 2-ethyl-2-n-butyl-1,3-propanediol, 2-ethyl-3-ethyl-1,4-butylene glycol, 2-methyl-3-ethyl-1,4-butylene glycol, 2,3-diethyl-1,5-pentadiol, 2,4-diethyl-1,5-pentadiol and 2,3,4-triethyl-1,5-pentadiol; or is selected from the group consisting of trimethylolpropane, dimethylol propionic acid, dimethylol butanoic acid, diacid diol, glycerol, pentaerythritol and alkylene oxide adducts of bisphenol A.

Preferably, the urethane reaction is carried out at a NCO/OH equivalent ratio between 1.1 and 2.3.

Step S3 is a dilution and chain extension step.

In the step S3, more acrylate monomers can be used together, which can be acrylate-based monomers selected from more than one of methyl acrylate, methyl methacrylate (MMA), ethyl acrylate (EA), isooctyl acrylate, butyl acrylate, methylbutyl acrylate, ethylhexyl acrylate and 2-hydroxyethyl acrylate (2-HEA), monomethyl maleate, methylhydrogen itaconate, monomethyl fumarate, and styrene and mixtures thereof. Three acrylate monomers, namely 2-hydroxyethyl acrylate, methyl methacrylate and ethyl acrylate, used together can provide complementary and synergistic effects on physical properties and act as solvents. 2-hydroxyethyl acrylate (2-HEA) containing hydroxyl groups (—OH) can react with isocyanate, and methyl methacrylate (MMA) and ethyl acrylate (EA) can increase the molecular weight of acrylic and remedy the shortcomings of polyurethane including poor heat resistance and low mechanical strength, so as to possess both excellent physical properties and solvent effect. In addition, no acetone is used so that the synthesis reaction yield can be significantly increased and the production cost is effectively reduced. Based on the total weight of the acrylic monomers, methyl methacrylate is present in an amount of 85-95 wt %, 2-hydroxyethyl acrylate is present in an amount of 4-9 wt %, and ethyl acrylate is present in an amount of 2-6 wt %.

The proportions of the aforesaid three acrylate monomers, based on the total weight of the acrylate monomers, are:
(a) 85-95 wt % of methyl methacrylate
(b) 4-9 wt % of 2-hydroxyethyl acrylate; and
(c) 2-6 wt % of ethyl acrylate.

Preferably, methyl methacrylate (MMA) is present in an amount of 92 wt %, 2-hydroxyethyl acrylate is present in an amount of 5 wt %, and ethyl acrylate is present in an amount of 3 wt %.

The sulfonate not only can serve as a hydrophilic agent of polyurethane, but also may serve as a polymer emulsifier. The sulfonate can be sodium ethylenediamino ethoxyethyl sulfonate.

Step S4 is a water dispersion step.

In the step S4, after dispersion in water, a metered amount of a water-soluble diamine-based chain extender is added to carry out a chain extension reaction. The chain extender can be selected from the group consisting of low molecular weight polyamines having a (number average) molecular weight less than 500, including ethylenediamine, hexamethylenediamine, xylenediamine, isophoronediamine, diethylenetriamine and N-amino ethyl-N-ethanolamine.

Step S5 is an acrylic synthesis step.

In the step S5, the at least one emulsifier required for emulsion polymerization is a surfactant that can significantly reduce surface tension. Accordingly, oil and water phases that are insoluble to each other can be transformed by stirring into a stable white emulsion which is not easily separated into layers. The at least one emulsifier may be selected from the group consisting of anionic emulsifiers, nonionic emulsifiers and reactive emulsifiers. One or more nonionic or anionic emulsifiers or surfactants may be used, including tert-octylphenoxyethyl poly(39)-ethoxyethanol, dodecyloxy poly(10) ethoxyethanol, nonyl phenoxyethyl-poly(40) ethoxyethanol, polyethyleneglycol(2000) monooleate, hydroxyethylated castor oil, fluorinated alkyl esters and alkyl oxide, polyethylene oxide (20) sorbitol monolaurate, sucrose monococoate, bis(2-butyl) phenoxy poly(20) ethoxyethanol, and hydroxyethyl cellulose polybutyl acrylate graft copolymer.

Suitable examples of the anionic emulsifier include sodium lauryl sulfate (SLS), sodium dodecyl benzene sulfonate, potassium stearate, sodium dioctyl sulfosuccinate, sodium dodecyldiphenyloxy disulfonate, sodium styrene sulfonate, nonylphenoxy poly ethyl (1) ethoxyethyl sulfate ammonium, sodium dodecyl allyl sulfosuccinate, linseed oil fatty acid, ethoxylated nonylphenol phosphate sodium, ethoxylated nonylphenol phosphate ammonium, sodium octoxynol-3-sulfate, sodium cocoyl sarcosinate, 1-alkoxy-2-sodium hydroxypropyl sulfonate, sodium alpha-olefin (C14-C16) sulfonate, sulfate of hydroxyl anol, N-(1,2-dicarboxyethyl)-N-octadecylsulfonylsuccinamate tetrasodium, N-octadecylsulfonylsuccinamyldisodium, alkylamidepolyethoxy sulfonylsuccinic acid disodium, disodium ethoxylated nonylphenol sulfonylsuccinate and sodium ethoxyethyl sulfate. The at least one emulsifier is present in an amount less than 3 wt % of the total weight of the acrylate monomers, i.e., is present in an amount of 0.3-1.0 wt % based on the total amount of the reaction raw materials.

The initiator can be a water-soluble free-radical initiator. Specific examples of the water-soluble free-radical initiator include hydrogen peroxide, tert-butyl peroxides and alkali metal persulfates such as sodium persulfate, potassium persulfate, lithium persulfate and ammonium persulfate (APS). The initiator is present in an amount of 0.01-3.0 wt % of the total weight of the acrylate monomers, i.e., is present in an amount of 0.01-1.0 wt % based on the total amount of the reaction raw materials.

At a subsequent stage of emulsion polymerization, in order to avoid the emulsion condensation caused by heating, the reducing agent can be used at 50-70° C. to post-eliminate the monomers to reduce the monomer residual rate. Specific examples of the reducing agent include sulfites such as alkali metal metabisulfites, hydrogen sulfites and hydrosulfites, sodium formaldehyde sulfoxylate (SFS), tert-butyl hydroperoxide (TBHP), and reducing sugars such as ascorbic acid and erythorbic acid. Sodium formaldehyde sulfoxylate (SFS) is suitable for post-elimination of methyl methacrylate and 2-hydroxyethyl acrylate, and tert-butyl hydroperoxide (TBHP) is suitable for post-elimination of ethyl acrylate and butyl acrylate. The reducing agent is present in an amount of 0.1-0.3 wt % of the total weight of the acrylate monomers, i.e., is present in an amount of 0.01-0.08 wt % based on the total amount of the reaction raw materials.

As described above, according to the present disclosure, a method for preparing a solvent-free hydrophilic group-containing aqueous polyurethane dispersion can be provided.

The present disclosure is further illustrated by the following examples and comparative examples, but the scope of the present disclosure is not limited to such examples.

EXAMPLE 1

The resulting product of Example 1 is formed by mixing an aqueous polyurethane as Resin A and a polyacrylate emulsion as Resin B. The process is described as follows.

Preparation of Aqueous Polyurethane (Resin A):

Firstly, 98.8 g of PTMG2000 (polyether diol, molecular weight 2000) and 6.44 g of 1,4-BG (1,4-butylene glycol, molecular weight 90) are added into a reactor in order. The resulting mixture is heated to 80° C. while stirring at uniform speed. After that, 43.5 g of isophorone diisocyanate is added and the temperature is raised to 85-90° C. for reaction for 2-3 hours. At this time, 147.2 g of methyl methacrylate (MMA), 8 g of 2-hydroxyethyl acrylate (2-HEA), 4.8 g of ethyl acrylate (EA) are added for dilution and reduction of viscosity of the resulting prepolymer. After that, 10.7 g of sodium ethylenediamino sulfonate (AAS) is added to the prepolymer to continue the reaction for 25-40 minutes. After cooling to room temperature, 236.3 g of deionized water is added under a rotary speed of 500 rpm and 0.95 g of ethylenediamine is added for chain extension for 30 minutes, so as to obtain a solvent-free sulfonate-based aqueous polyurethane emulsion.

Preparation of Polyacrylate Emulsion (Resin B):

Firstly, 4.8 g of sodium lauryl sulfate (SLS) is added to the aforesaid sulfonate-based aqueous polyurethane emulsion under high-speed stirring. The resulting mixture is heated to 50-70° C. and subsequently 0.40 g of ammonium persulfate aqueous solution (APS) is dropwise added. The temperature is raised to 75-85° C. and maintained thereat for 1-3 hours. After cooling to 50-70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified aqueous polyurethane.

The solid contents of the resulting product of Example 1 are: Resin A and Resin B at a ratio of 1:1. Resin A is synthesized by sodium ethylenediamino sulfonate (AAS).

EXAMPLE 2

Similar to Example 1, the resulting product of Example 2 is formed by mixing an aqueous polyurethane as Resin A and a polyacrylate emulsion as Resin B, but sodium ethylenediamino ethoxyethyl sulfonate is used in place of sodium ethylenediamino sulfonate (AAS) for synthesis of Resin A. The process is described as follows.

Preparation of Aqueous Polyurethane (Resin A):

Firstly, 98.8 g of PTMG2000 (polyether diol, molecular weight 2000) and 6.44 g of 1,4-BG (1,4-butylene glycol, molecular weight 90) are added into a reactor in order. The resulting mixture is heated to 80° C. while stirring at uniform speed. After that, 43.5 g of isophorone diisocyanate is added and the temperature is raised to 85-90° C. for reaction for 2-3 hours. At this time, 147.2 g of methyl methacrylate (MMA), 8 g of 2-hydroxyethyl acrylate (2-HEA), 4.8 g of ethyl acrylate (EA) are added for dilution and reduction of viscosity of the resulting prepolymer. After that, 13.2 g of sodium ethylenediamino ethoxyethyl sulfonate is added to the prepolymer to continue the reaction for 25-40 minutes. After cooling to room temperature, 236.3 g of deionized water is added under a rotary speed of 500 rpm and 0.95 g of ethylenediamine is added for chain extension for 30 minutes, so as to obtain a solvent-free sulfonate-based aqueous polyurethane emulsion.

Preparation of Polyacrylate Emulsion (Resin B):

Firstly, 4.8 g of sodium lauryl sulfate (SLS) is added to the aforesaid sulfonate-based aqueous polyurethane emulsion under high-speed stirring. The resulting mixture is heated to 50-70° C. and subsequently 0.40 g of ammonium persulfate aqueous solution (APS) is dropwise added. The temperature is raised to 75-85° C. and maintained thereat for 1-3 hours. After cooling to 50-70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified aqueous polyurethane.

The solid contents of the resulting product of Example 2 are: Resin A and Resin B at a ratio of 1:1. Resin A is synthesized by sodium ethylenediamino ethoxyethyl sulfonate.

EXAMPLE 3

Similar to Example 2, the resulting product of Example 2 is formed by mixing an aqueous polyurethane as Resin A and a polyacrylate emulsion as Resin B, but Resin A is present in a higher proportion. The process is described as follows.

Preparation of Aqueous Polyurethane (Resin A):

Firstly, 197.6 g of PTMG2000 (polyether diol, molecular weight 2000) and 12.9 g of 1,4-BG (1,4-butylene glycol, molecular weight 90) are added into a reactor in order. The resulting mixture is heated to 80° C. while stirring at uniform speed. After that, 87 g of isophorone diisocyanate is added and the temperature is raised to 85-90° C. for reaction for 2-3 hours. At this time, 147.2 g of methyl methacrylate (MMA), 8 g of 2-hydroxyethyl acrylate (2-HEA), 4.8 g of ethyl acrylate (EA) are added for dilution and reduction of viscosity of the resulting prepolymer. After that, 26.4 g of sodium ethylenediamino ethoxyethyl sulfonate is added to the prepolymer to continue the reaction for 25-40 minutes. After cooling to room temperature, 482.6 g of deionized water is added under a rotary speed of 500 rpm and 1.9 g of ethylenediamine is added for chain extension for 30 minutes, so as to obtain a solvent-free sulfonate-based aqueous polyurethane emulsion.

Preparation of Polyacrylate Emulsion (Resin B):

Firstly, 4.8 g of sodium lauryl sulfate (SLS) is added to the aforesaid sulfonate-based aqueous polyurethane emulsion under high-speed stirring. The resulting mixture is heated to 50-70° C. and subsequently 0.40 g of ammonium persulfate aqueous solution (APS) is dropwise added. The temperature is raised to 75-85° C. and maintained thereat for 1-3 hours. After cooling to 50-70° C., 0.15 g of tert-butyl hydroperoxide aqueous solution (TBHP) and 0.16 g of sodium formaldehyde sulfoxylate (SFS) serving as reducers are added for reaction for 30 minutes, so as to obtain an acrylic-grafting-modified aqueous polyurethane.

The solid contents of the resulting product of Example 3 are: Resin A and Resin B at a ratio of 1:1. Resin A is synthesized by sodium ethylenediamino ethoxyethyl sulfonate.

COMPARATIVE EXAMPLE 1

In this example, an aqueous polyurethane, which is synthesized by the acetone method without mixing with a polyacrylate emulsion. The process is described as follows.

Preparation of Aqueous Polyurethane (Resin A):

Firstly, 75 g of PTMG2000 (polyether diol, molecular weight 2000) and 7.3 g of 1,4-BG (1,4-butylene glycol, molecular weight 90) are added into a reactor in order. The resulting mixture is heated to 80° C. while stirring at uniform speed. After that, 58.8 g of isophorone diisocyanate is added and the temperature is raised to 85-90° C. for reaction for 2-3 hours. After cooling to 30-50° C., 160 g of acetone is added for dilution and reduction of viscosity of the resulting prepolymer. Twenty minutes later, 17.5 g of sodium ethylenediamino sulfonate (AAS) is added to continue the reaction for 25-40 minutes. After cooling to room temperature, 266.6 g of deionized water is added under a rotary speed of 500 rpm and 1.1 g of ethylenediamine is added for chain extension for 30 minutes. After distillation of acetone, an acrylic-free sulfonate-based aqueous polyurethane emulsion is obtained.

Results

The resulting products of Examples 1-3 and Comparative Example 1 are respectively applied to synthetic leathers for evaluation tests on physical properties. The results are shown in Table 1.

TABLE 1

| | | Example 1 | Example 2 | Example 3 | Comparative Example 1 |
|---|---|---|---|---|---|
| Test results | Crumpling resistance (1.5 Kg*1000 times) | No damage | No damage | No damage | No damage |
| | Corner whitening (3 Kg*24 hours) | No whitening | No whitening | No whitening | No whitening |
| | Heat-resistant adhesion (70° C.*3 Kg*24 hours) | No sticking | No sticking | No sticking | Seriously sticking |
| | Hydrolysis resistance (10% NaOH*8 hours) | No cracks | No cracks | No cracks | Serious cracks |
| | Level property | Good | Good | Good | Good |
| | Weather resistance (70° C.*95% RH) | Normal for 14 weeks | Normal for 14 weeks | Normal for 10 weeks | Normal for 5 weeks |
| | Acetone content (ppm) | None | None | None | 1486 |

Based on the above, in the embodiments of the present disclosure, sodium ethylenediamino ethoxyethyl sulfonate is used in place of sodium ethylenediamino sulfonate (AAS) to achieve better flowability, and uses the acrylic graft modification is used to increase heat resistance and hydrolysis resistance. Furthermore, the increase of the proportion of acrylic monomer can increase weather resistance, and acrylic graft modification can remedy the shortcomings of polyurethane including poor heat, weather and hydrolysis resistances. In addition, the present disclosure can solve the problem of residual acetone and can meet the aqueous requirements.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for preparing an aqueous polyurethane dispersion, composing:
   (1) a preparation step of sodium ethylenediamino ethoxyethyl sulfonate including: reacting sodium ethylenediamino sulfonate with ethylene glycol to obtain the sodium ethylenediamino ethoxyethyl sulfonate;
   (2) a preparation step of a prepolymer including: vacuum-dehydrating 15-25 wt % of a polyol and adding the vacuum-dehydrated polyol into a reactor equipped with a mixer, a thermometer and a condensing tube, and adding a metered amount of 5-12 wt % of a polyisocyanate into the reactor when an oil bath temperature reaches 70-80° C. to carry out a synthetic reaction so as to obtain the prepolymer;
   (3) a dilution and chain extension step of the prepolymer including: after reacting the prepolymer obtained from the step (2) for 2-3 hours, adding 10-30 wt % of more than one acrylic monomer to reduce the viscosity of the prepolymer and maintaining the reaction temperature at 85-90° C. until an NCO content (NCO %) of the prepolymer reaches a target value, and subsequently adding 1.8-3.7 wt % of the sodium ethylenediamino ethoxyethyl sulfonate obtained from the step (1) to continue the reaction for 25-40 minutes;
   (4) a water dispersion step including: cooling a polymer obtained from the step (3) to room temperature and adding 35-55 wt % of deionized water to the polymer under a high-speed shearing force that is generated at a rotation speed of 500 rpm, and subsequently adding a metered amount of 0.1-0.5 wt % a chain extender to carry out a chain extension reaction for 30 minutes so as to obtain a solvent-free sulfonate-type aqueous polyurethane dispersion; and
   (5) an acrylic synthesis step including: mixing the aqueous polyurethane dispersion obtained from the step (4) with 0.3-1.0 wt % of an emulsifier to form an emulsion, raising the reaction temperature to 50-70° C. after stirring evenly and then dropwise adding 0.01-0.10 wt % of an initiator, raising the reaction temperature to 75-85° C. to carry out an acrylic polymerization reaction for 1-3 hours, and adding 0.01-0.08 wt % of a reducing agent after reducing the reaction temperature to 50-70° C. so as to obtain an acrylic-grafting-modified aqueous polyurethane.

2. The method according to claim 1, wherein, in the step (2), the polyol is a polyester polyol, a polyether polyol, a polycarbonate polyol or any combination thereof and the polyisocyanate is a diisocyanate, and the polyol and the polyisocyanate are reacted in an NCO/OH equivalent ratio from 1.1 to 2.3.

3. The method according to claim 1, wherein, in the step (3), the more than one acrylic monomer is selected from the group consisting of methyl acrylate, methyl methacrylate, ethyl acrylate, 2-hydroxyethyl acrylate, isooctyl acrylate, butyl acrylate and ethylhexyl acrylate, and the more than one acrylic monomer is added in an amount of 10-30 wt % of the total amount of the reaction raw materials.

4. The method according to claim 3, wherein the more than one acrylic monomer includes 2-hydroxyethyl acrylate (2-HEA), methyl methacrylate (MMA) and ethyl acrylate (EA).

5. The method according to claim 4, wherein, based on the total weight of the more than one acrylic monomer, methyl methacrylate is present in an amount of 85-95 wt %, 2-hydroxyethyl acrylate is present in an amount of 4-9 wt %, and ethyl acrylate is present in an amount of 2-6 wt %.

6. The method according to claim 4, wherein, based on the total weight of the more than one acrylic monomer, methyl methacrylate is present in an amount of 92 wt %, 2-hydroxyethyl acrylate is present in an amount of 5 wt %, and ethyl acrylate is present in an amount of 3 wt %.

7. The method according to claim 1, wherein, in the step (3), the sodium ethylenediamino ethoxyethyl sulfonate is added in an amount of 80-90% of an NCO/OH equivalent ratio.

8. The method according to claim 1, wherein, in the step (3), the target value of the NCO content of the chain-extended prepolymer is 0.5-10%; the target value of the NCO content satisfies the following formula: (the amount of the polyisocyanate/the molecular weight of the polyisocyanate the amount of the polyol/the molecular weight of the polyol)×42×2 x %.

9. The method according to claim 1, wherein, in the step (4), the chain extender is selected from the group consisting of ethylenediamine, hexamethylenediamine, xylenediamine, isophoronediamine, diethylenetriamine or N-aminoethyl-N-ethanolamine, which has a molecular weight less than 500, and the chain extender is added in an amount of 10-20% of an NCO/OH equivalent ratio.

10. The method according to claim 1, wherein, in the step (5), the initiator is selected from the group consisting of hydrogen peroxide, tert-butyl peroxide, sodium persulfate, potassium persulfate, lithium persulfate and ammonium persulfate, and the initiator is added in an amount of 0.01-3 wt % based on the total amount of the more than one acrylic monomer.

* * * * *